(12) United States Patent
Adams

(10) Patent No.: US 12,531,588 B2
(45) Date of Patent: Jan. 20, 2026

(54) SYSTEM AND METHOD OF DEVICE SCREEN PROTECTION

(71) Applicant: John Quincy Adams, Alpine, UT (US)

(72) Inventor: John Quincy Adams, Alpine, UT (US)

( * ) Notice: Subject to any disclaimer, the term of this patent is extended or adjusted under 35 U.S.C. 154(b) by 472 days.

(21) Appl. No.: 17/647,011

(22) Filed: Jan. 4, 2022

(65) Prior Publication Data

US 2022/0216890 A1 Jul. 7, 2022

Related U.S. Application Data

(60) Provisional application No. 63/151,540, filed on Feb. 19, 2021, provisional application No. 63/134,132, filed on Jan. 5, 2021.

(51) Int. Cl.
*H04B 1/3888* (2015.01)
*G06F 1/16* (2006.01)
*H04M 1/04* (2006.01)

(52) U.S. Cl.
CPC ......... *H04B 1/3888* (2013.01); *G06F 1/1656* (2013.01); *H04M 1/04* (2013.01); *H04M 2201/38* (2013.01)

(58) Field of Classification Search
CPC ...... H04B 1/3888; G06F 1/1656; H04M 1/04; H04M 2201/38
USPC ...................................................... 455/575.8
See application file for complete search history.

(56) References Cited

U.S. PATENT DOCUMENTS

| 8,640,759 | B2 * | 2/2014 | Chen | B29C 63/0004 |
| | | | | 455/575.8 |
| 8,944,425 | B2 * | 2/2015 | Napier | B32B 27/06 |
| | | | | 269/289 R |
| 9,582,040 | B2 * | 2/2017 | Leonhard | G06F 3/0393 |
| 2013/0280463 | A1 * | 10/2013 | On | B44C 1/105 |
| | | | | 428/38 |
| 2015/0273786 | A1 * | 10/2015 | Ozeki | B29C 63/0047 |
| | | | | 428/41.7 |
| 2016/0085004 | A1 * | 3/2016 | Hamberg | G02B 5/23 |
| | | | | 359/241 |
| 2017/0115819 | A1 * | 4/2017 | Thorstenson | G06F 3/0488 |
| 2018/0309867 | A1 * | 10/2018 | Sabin | G06F 3/0304 |
| 2019/0098120 | A1 * | 3/2019 | Deng | C09J 7/00 |

FOREIGN PATENT DOCUMENTS

CN 106995096 A 8/2017

OTHER PUBLICATIONS

International Search Report and Written Opinion mailed Apr. 6, 2022 related to PCT Application No. PCT/US2022/070052.

* cited by examiner

*Primary Examiner* — April G Gonzales
(74) *Attorney, Agent, or Firm* — Dergosits & Noah LLP

(57) ABSTRACT

A method of attaching a screen protector to an electronic device may include determining a type of a device to protect with a screen protector. The method may also include obtaining a screen protector based upon the type of the device. The screen protector may include an adhesive configured to attach the screen protector to the device. The screen protector may include indicia to align the screen protector with the device. The method may further include displaying an image on the device. The method may also include aligning the indicia on the screen protector with the image on the device. The method may further include attaching the screen protector to the device. The method may further include removing the indicia from the screen protector.

18 Claims, 7 Drawing Sheets

SYSTEM AND METHOD OF DEVICE SCREEN PROTECTION

CROSS-REFERENCE TO RELATED APPLICATIONS

The present application claims priority to and the benefit of United States Provisional Patent Application Nos. 63/134,132, filed on Jan. 5, 2021, titled "INSTALLATION OF SCREEN PROTECTION FOR MOBILE ELECTRONIC DEVICES", and 63/151,540, filed on Feb. 19, 2021, titled "INSTALLATION OF SCREEN PROTECTION FOR MOBILE ELECTRONIC DEVICES", each of which is incorporated by reference in its entirety.

FIELD

The present disclosure is generally directed to an accessory for an electronic device and, in particular, to a screen protector for an electronic device.

BACKGROUND

Unless otherwise indicated herein, the materials described herein are not prior art to the claims in the present application and are not admitted to be prior art by inclusion in this section.

Some electronic devices include display screens and display screens may include fragile materials, such as glass. In some circumstances, a user may attempt to protect a display screen by affixing an accessory, such as a screen protector, to the display screen. Many users of electronic devices with display screens take the electronic devices to retail stores or service providers to have a screen protector installed. For example, many electronic devices are taken to specialty stores or service providers that are dedicated to installing screen protectors because screen protectors may be difficult for ordinary consumers to install. For instance, it may be problematic for many consumers to correctly attach the screen protector to the electronic device. In addition, consumers may not have the proper tools or know-how to install a screen protector.

The subject matter claimed in the present disclosure is not limited to embodiments that solve any disadvantages or that operate only in environments such as those described above. Rather, this background is only provided to illustrate one example technology area where some embodiments described in the present disclosure may be practiced.

SUMMARY

A need therefore exists for an accessory, such as a screen protector, that eliminates the above-described disadvantages and problems.

One aspect is an accessory, such as a screen protector, that is readily installed. For example, the screen protector may be readily installed by a consumer. The screen protector may include indicia and the indicia may facilitate attachment of the screen protector to an electronic device. The indicia may be removed after the screen protector is attached to the electronic device.

Advantageously, the screen protector may be quickly and easily aligned during the installation process. Thus, the effectiveness of the screen protector may be increased because it may be correctly aligned. In addition, the electronic device and/or the screen protector may help position the screen protector without the need of a guide, template, and/or other aid. This may facilitate attachment of the screen protector to the electronic device by consumers, and this may expedite installation of the screen protector. Further, the screen protector may be quickly and easily replaced if it is damaged, marred, or otherwise desired to be exchanged with another accessory.

According to an aspect of an exemplary embodiment, a method may include determining a type of a device to protect with a screen protector. For example, the device may display information regarding the type of the device on a display screen. In an exemplary embodiment, the device may determine the type of device and provide that information. The information regarding the type of device may be used to obtain a desired screen protector. For instance, the information may be provided to a user and the user may select, obtain, or order the desired screen protector. The information may be provided to a retailer, service provider, or the like, and the desired screen protector may be obtained. The method may include obtaining a screen protector based upon the type of the device. The screen protector may include an adhesive that may be configured to attach the screen protector to the device. The screen protector may include indicia that may align the screen protector with the device. The method may also include displaying an image on the device. The method may further include aligning the indicia on the screen protector with the image on the device. The method may further include attaching the screen protector to the device. The method may also include removing the indicia from the screen protector.

In another exemplary embodiment, an apparatus may include a screen protector, an adhesive, and indicia. For example, the screen protector may include a first side and a second side. The adhesive may be disposed on the first side of the screen protector, and the adhesive may be configured to attach the screen protector to a screen of an electronic device. The indicia may be disposed on the second side of the screen protector. The indicia may be configured to be aligned with an image displayed on the screen of the electronic device. Aligning the indicia and the image may facilitate attachment of the screen protector to the screen. For example, all or a portion of the indica may at least partially cover an image displayed on the device. Advantageously, the positioning of the indicia relative to the image on the device may help position, locate, and/or align the screen protector.

These and other aspects, features and advantages may become more fully apparent from the following brief description of the drawings, the drawings, the detailed description of preferred embodiments and appended claims.

The objects and advantages of the example embodiments may be realized and achieved at least by the elements, features, and combinations particularly pointed out in the claims.

BRIEF DESCRIPTION OF THE DRAWINGS

The appended drawings contain figures of exemplary embodiments to further illustrate and clarify the above and other aspects, advantages and features of the present invention. It will be appreciated that these drawings depict only exemplary embodiments of the invention and are not intended to limit its scope. Additionally, it will be appreciated that while the drawings may illustrate exemplary sizes, scales, relationships and configurations of the invention, the drawings are not intended to limit the scope of the claimed invention. The invention will be described and explained with additional specificity and detail by the accompanying drawings in which:

DESCRIPTION OF EXAMPLE EMBODIMENTS

Electronic devices are often an expensive device to obtain and often fragile relative to drops, strikes, scratches, dents, etc. In some circumstances, the display screen of an electronic device is prone to damage as the display screen may be constructed from glass. Protecting the display screen of an electronic device may extend a usable period of time for the electronic device, which may reduce the costs associated with acquiring the electronic device.

In some circumstances, applying a screen protector to cover the display screen may provide a layer of protection to the electronic device, which may contribute to an extended usable timeframe for the electronic device. In some circumstances, it may be difficult to determine which screen protector is the configured for the electronic device. Alternatively, or additionally, once a screen protector is acquired, it may be difficult for the user to properly align the screen protector with the device to increase the effectiveness of the screen protector in covering portions of the electronic device.

In some embodiments of the present disclosure, one or more aspects of an electronic device may be configured to determine a screen protector that may be configured to be attached to a device. In some embodiments, determining the proper screen protector may be done automatically. Alternatively, or additionally, one or more aspects of an electronic device and/or a screen protector may contribute to a proper alignment of the screen protector relative to the electronic device. Further, the one or more aspects of an electronic device and/or a screen protector may provide an indication to the user that the screen protector was correctly attached to the electronic device.

The present disclosure is generally directed towards a screen protector for an electronic device. The principles of the present disclosure, however, are not limited to screen protectors. It will be understood that, in light of the present disclosure, other electronic devices accessories may be used in conjunction with an electronic device. For example, a filter, a lens, a case, and/or other accessories may be configured and/or attached to an electronic device using the principles described herein. Moreover, the screen protector is not necessarily limited to protecting a screen, display screen, or the like. The screen protector could also protect other features, aspects, and/or components such as a camera, lens, case, input/output device, etc.

Figure 1A:
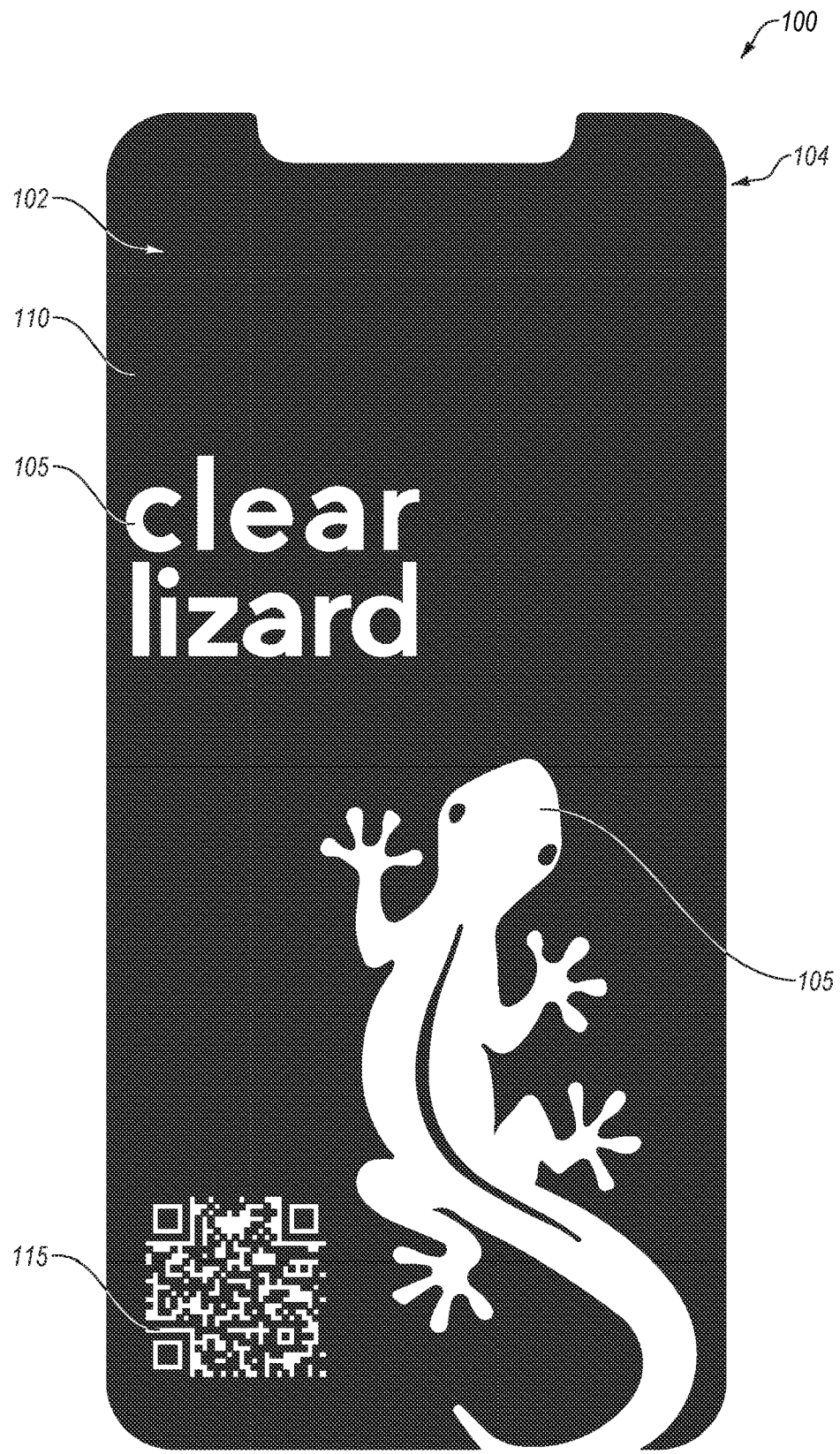
FIGS. 1A, 1B, and 1C illustrate an example screen protector, an example device, and a combination of the example screen protector and the example device, respectively.
Figure 1B:
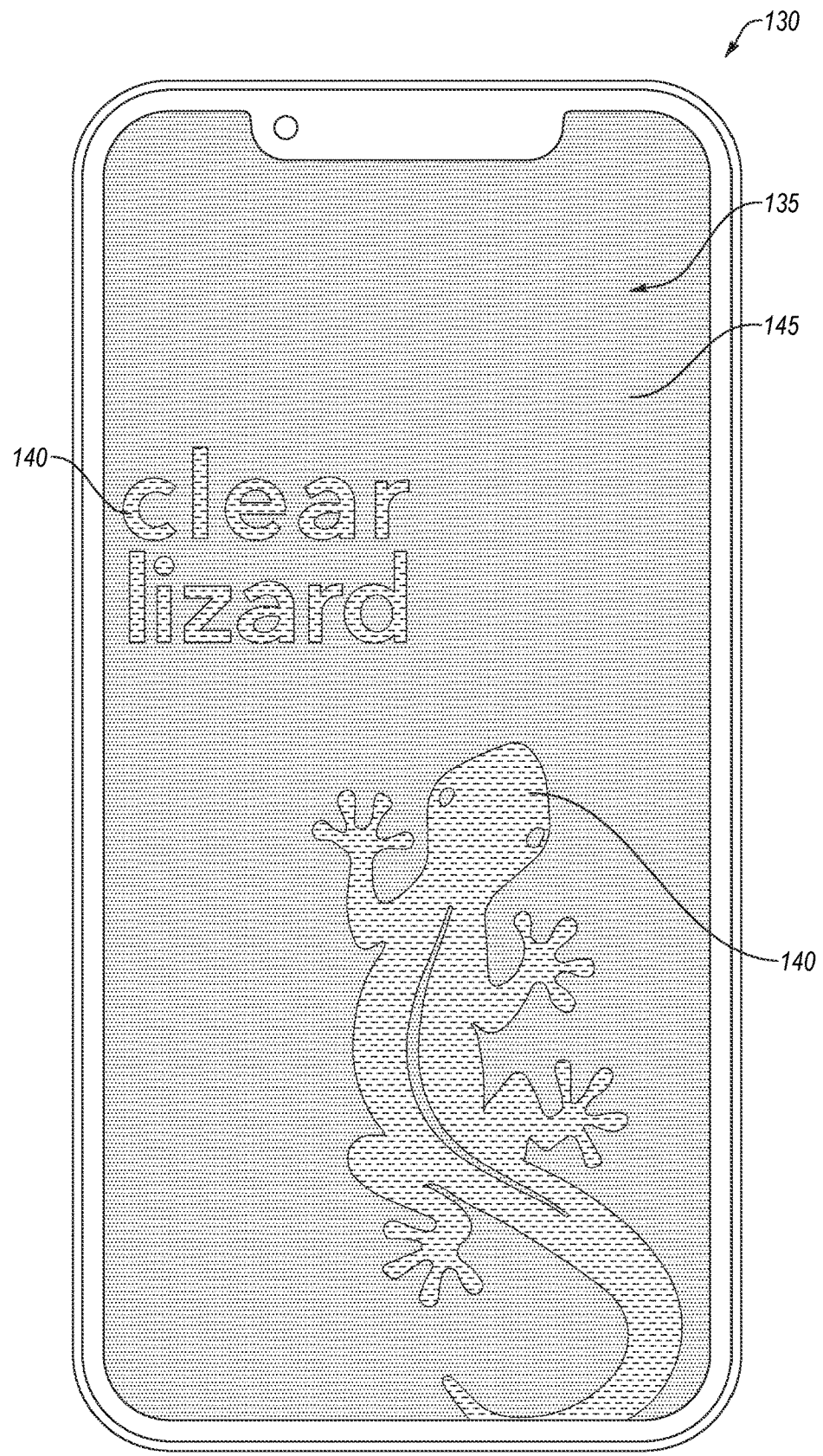
Figure 1C:
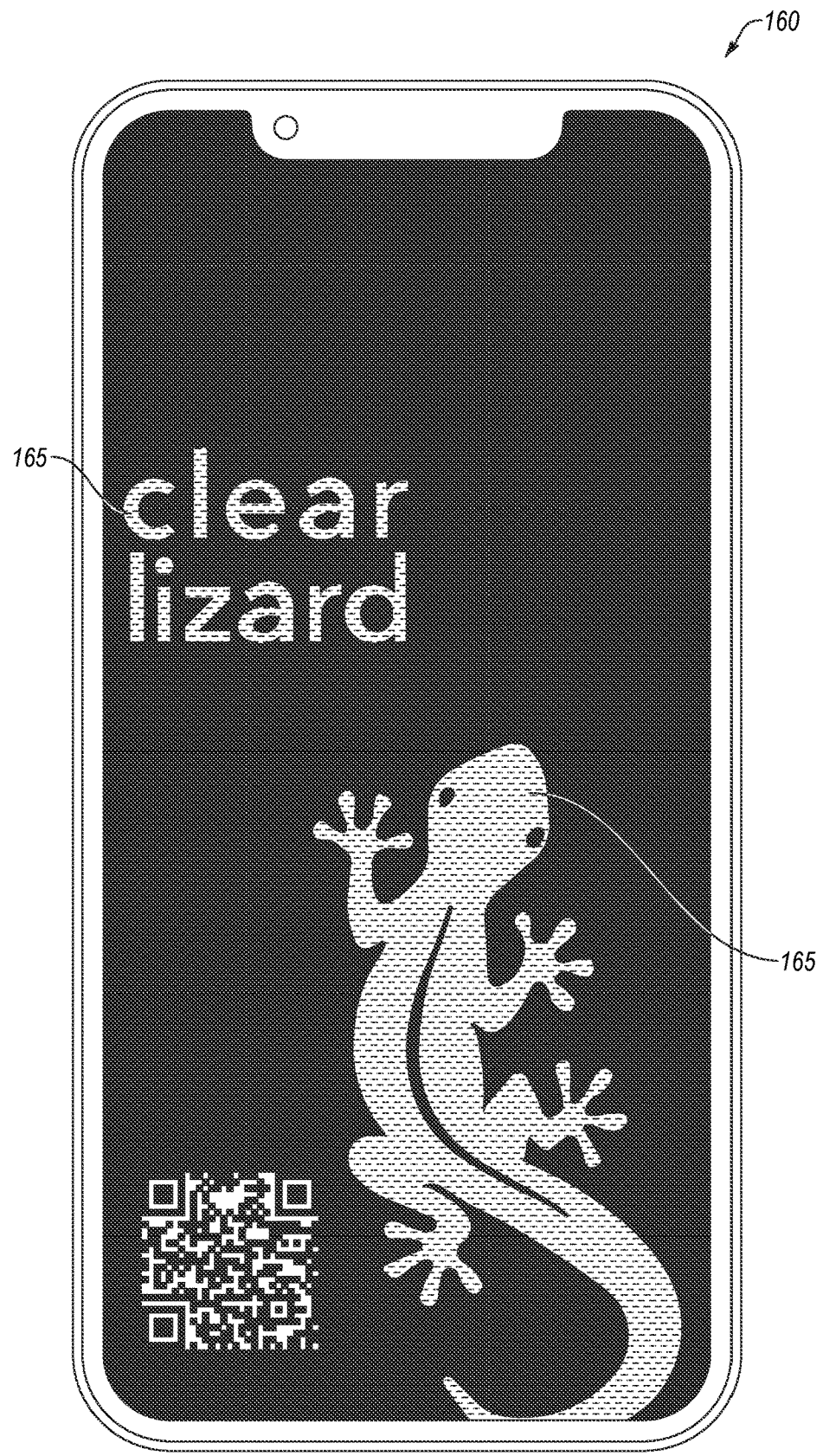

FIGS. 1A, 1B, and 1C illustrate an example screen protector 100, an example device 130, and a combination 160 of the screen protector 100 and the device 130, respectively, in accordance with at least one exemplary embodiment described in the present disclosure. The screen protector 100 may include a first side 102, a second side 104, indicia 105, an opaque portion 110, and link element 115. The device 130 may include a display screen 135, an image 140, and a contrast portion 145. The combination 160 may include an overlaid image 165. It will be appreciated that the screen protector 100 and/or the device 130 may include other features, aspects, components, and the like.

In some embodiments, the first side 102 may be opposite the second side 104. As illustrated in FIG. 1A, only the second side 104 the screen protector 100 is shown. In some embodiments, the first side 102 may include an adhesive. The adhesive on the first side 102 may be configured to attach the screen protector 100 to a device, such as the device 130. In some embodiments, the adhesive may include any adhesive configured to attach a screen protector to a device. For example, the adhesive may include a solvent based acrylic adhesive, a liquid optical glue, a pressure sensitive adhesive, and/or other similar adhesives.

In some embodiments, the adhesive may be covered by a first removable film. For example, a film may cover the adhesive such that the adhesive may be restricted from adhering to an object prior to a desired installation, such as installation to a device. In some embodiments, the first removable film may include a size and shape at least substantially similar to the screen protector 100. For example, in instances in which the screen protector 100 includes a cutout portion for a camera of a device, the first removable film may include a similar cutout. Alternatively, or additionally, all or portions of the first removable film may be larger than the screen protector 100 such that all or portions of the adhesive on the screen protector 100 may be covered. For example, in instances in which the screen protector 100 includes a cutout portion for a camera of a device, the first removable film may not include a similar cutout.

In some embodiments, the second side 104 may include the indicia 105. The indicia 105 may include one or more indications, marks, distinctive features, and the like. Alternatively, or additionally, the second side 104 may include the opaque portion 110 and/or the link element 115. Alternatively, or additionally, the second side 104 may include a second removable film that may be configured to be attached to the screen protector 100. For example, the indicia 105, the opaque portion 110, and/or the link element 115 may be disposed on the second removable film, and the second removable film may be disposed on the second side 104 of the screen protector 100.

In some embodiments, the indicia 105 may include one or more shapes, images, and/or text that may be substantially transparent. For example, as illustrated in the accompanying drawings, the indicia 105 may include the text "clear lizard" and an image of a lizard. All or a portion the indicia 105 may be at least substantially opaque and/or transparent depending, for example, upon the intended use of the indicia 105.

In some embodiments, the opaque portion 110 may be disposed on the second side 104 of the screen protector 100. The opaque section 110 may be disposed, for example, on the second removable film, and the opaque portion 110 may be disposed inverse to the indicia 105. For example, in instances in which the indicia 105 includes the text "clear lizard" and/or an image of a lizard, the opaque portion 110 may include other portions of the second removable film. In some embodiments, all or a portion of the opaque portion 110 may be configured to obstruct and/or limit viewing therethrough. For example, when viewing the screen protector 100 having the second removable film, it may be possible to see through the indicia 105 and/or it may be difficult and/or impossible to see through the opaque portion 110. Alternatively, or additionally, it may be difficult and/or impossible to see through the indicia 105 and/or the opaque portion 110. In some embodiments, the indicia 105 and/or the opaque portion 110 may include a reflective element, a visual modulation element, and/or other differing appearances which may be designed to differentiate the visuality of the indicia 105 and/or the opaque portion 110.

In some embodiments, the link element 115 may be disposed on the second side 104 of the screen protector 100. For example, the link element 115 may be disposed on the second removable film. In some embodiments, the link element 115 may be configured to direct an electronic device, such as the device 130, to a website. For example, the link element 115 may include a barcode, a quick response (QR) code, and/or any other machine-readable optical label. In instances in which the device 130 scans the link element 115, the device 130 may display or access a website, and the website may include information related to the screen protector 100. For example, upon scanning the link element 115, the device 130 may display information associated with the screen protector 100 and/or the device 130, such as installation instructions, answers to frequently asked questions regarding installation, products available that may be associated with the screen protector and/or the type of electronic device, etc.

In some embodiments, the screen protector 100 may include a size and/or shape that may be based on a type of device to which the screen protector 100 may be configured to be attached. For example, the screen protector 100 may be approximately the size of a mobile phone in instances in which the device 130 is a mobile phone. In some embodiments, the device may be configured to determine the size and shape of a screen protector 100. Alternatively, or additionally, the device may be configured to automatically determine the size and shape of a screen protector 100, such as without any user input. For example, the device 130 may be able to determine the type of device (such as make and model of the device), and the device 130 may provide and/or display that information. Additional details related to the device and/or the determinations associated with the screen protector may be further discussed herein, such as related to the device 130 of FIG. 1B or the GUI 200 of FIG. 2.

In some embodiments, the screen protector 100 may be sized, shaped, and/or configured to cover and/or protect some or all of the device 130, such as all or a portion of a display screen 135. For example, in instances in which the display screen 135 is smaller than the body of the device, the screen protector 100 may be sized and shaped to cover at least a portion of the display screen 135. Alternatively, or additionally, the screen protector 100 may be sized and shaped to cover and/or protect at least substantially all of the display screen 135 of the device 130. The screen protector 100 may also be sized and shaped to cover and/or protect other portions of the device 130, such as glass portions of the device that may be coplanar with the display screen 135. The screen protector 100 may also be sized, shaped, configured, and/or arranged to cover and/or protect other portions of the device 130. For example, the screen protector 100 may be sized and shaped to cover and/or protect the display screen 135, one or more bezels, a camera and/or camera lens, and/or other sensors associated with the device 130. Alternatively, or additionally the screen protector 100 may include cutouts, notches, and/or other variations which may accommodate various features of the device 130. For example, the screen protector 100 may include a cutout and/or notch for front, rear, and/or side facing speakers, a camera and/or camera lens, other sensors associated with the device 130, and/or other elements associated with the device 130.

In some embodiments, the device 130 may include the display screen 135 on at least one side of the device 130. In some embodiments, the display screen 135 may occupy at least substantially all the side of the device 130. Alternatively, or additionally, the device 130 may include one or more bezels, one or more notches, and/or other elements in conjunction with the display screen 135, which in combination, may occupy at least substantially all the side of the device 130.

In some embodiments, the device 130 may be configured to determine the screen protector 100 that may be used in connection with the device 130. For example, the device 130 may help determine the size, shape, configuration, arrangement, and/or type of screen protector 100 for the device 130. For instance, the screen protector 100 may be selected to fit at least a portion of the device 130, such as covering the display screen 135 and/or camera lens of the device 130. In some embodiments, the device 130 may be configured to determine the screen protector 100 that may be sized and shaped such that the screen protector 100 may cover at least the display screen 135 of the device 130. For example, the device 130 may include a processing element configured to determine a device type, a device ID, an ISP associated with the device 130, geographic data associated with the device 130, a servicer associated with the device 130, related devices to the device 130, and/or other device information associated with the device 130.

In some embodiments, the processing element associated with the device 130 may be configured to determine the device information without user input. For example, the user may provide an input and/or indication to the processing element of the device 130 to determine the device type associated with the device 130, and the processing element may determine the device type without any user input. For example, in instances in which a user is looking for a screen protector for the device 130, the user may initiate the processing element of the device 130, and the processing element may determine the device type is a first device type (e.g., an iPhone® 13 mini). The device 130, or the processing element of the device 130, may determine, indicate, and/or select a first screen protector that is sized and shaped for the first device type. In some embodiments, the processing element of the device 130 may be configured to display the determined device type to the user, such as on the display screen 135. For example, in instances in which the processing element determines the device type is a first device type, the first device type may be displayed on the display screen 135 of the device 130. In some embodiments, the processing element of the device 130, which may include determining the device type associated with the device 130, may be performed by a progressive web application (PWA), a web browser, a device application (or just application), and/or other software that may be executed on the device 130. For example, the PWA or application may be downloaded onto the device 130 and the user may initiate the processing element on the downloaded software.

In some embodiments, the device 130 may be configured to display the image 140, such as on the display screen 135. In some embodiments, the processing element of the device 130 may determine the image 140 to be displayed, which may be associated with the indicia 105 of the screen protector 100. For example, in instances in which the processing element of the device 130 determines a first screen protector, which may include a first indicia, may be used with the device 130, the processing element may be configured to display a first image, which may be similar, associated, related, or correspond with the first indicia. In some embodiments, the image 140 may be at least substantially the same as the indicia 105. For example, in instances in which the indicia 105 includes text and an image, the image 140 may include the same or similar text, which may include the same font and size, and the same or similar image, which may include similar dimensions.

In some embodiments, the image 140 may include a first color scheme and/or a first pattern. Alternatively, or additionally, the contrast portion 145 may include a second color scheme and/or a second pattern, which may differ from the first color scheme and/or the first pattern. For example, the image 140 may include a green color and the contrast portion 145 may include a red color. Alternatively, or additionally, the image 140 may include a straight-line pattern and the contrast portion 145 may include a spiral pattern. Alternatively, or additionally, any combination of colors and/or patterns may be used for the image 140 and the contrast portion 145, such that the two portions of the display screen 135 may be discernable from the other.

In some embodiments, the image 140 may be obtained from an application on the device 130. For example, the image 140 may be included and/or selected from a preset collection of images in a progressive web application (PWA), a web browser, an application on the device 130, a local file on the device 130, or an image library that may be located on the device and/or a storage device remote from the device 130. Alternatively, or additionally, the image 140 may be obtained from a camera image, such as described herein relative to FIG. 3.

In some embodiments, the device 130 may include a calibration tool that may be configured to determine and/or provide information about the device 130, a screen protector for the device 130, and/or indicia for the screen protector. For example, the device 130 may determine or provide information about screen protectors, screen protector dimensions, indicia images, indicia sizes, indicia orientations, and/or other information for various devices. For instance, in an exemplary embodiment where a new device type is detected (e.g., an existing size and orientation for the device is not known and/or stored), the calibration tool may obtain new dimensions associated with the new device type and may correlate the new dimensions and the new device type. In some embodiments, the device 130 may be configured to update a general database such that other devices may be configured to recognize the new device type thereafter.

In some embodiments, the calibration tool may be used to generate an image, such as the image 140. Alternatively, or additionally, the calibration tool may be configured to generate and/or align matching indicia, such as the indicia 105, with the image for the new device type. For example, a digital image generated to match new indicia may include one or more differences in size, scale, orientation, offset, and/or other aspects from the new indicia. The calibration tool may allow an operator to zoom, rotate, laterally translate, pan, and/or make other modifications to the new image such that the new image may substantially match the new indicia. After manipulating the new image to match the new indicia, the calibration tool may be configured to update the general database such that the new image and new indicia may be used with the new device type. In these and other embodiments, the general database may include a table, database, or other storage instrument of known devices and associated images and indicia. In some embodiments, the general database may be accessible by devices when attempting to identify a device type, an image, indicia, and/or other information associated with a device and/or screen protector.

In some embodiments, the screen protector 100 may be configured to be attached to at least a portion of the device 130, such as the display screen 135, which may result in the combination 160. In some embodiments, the combination 160 may include a user attaching the screen protector 100 to the display screen 135. In some embodiments, the user may use the indicia 105 and the image 140 to align the screen protector 100 with the display screen 135. For example, the user may align some or all the indicia 105 with some or all of the image 140 such that the screen protector 100 may be aligned with the device 130 and/or the display screen 135.

In some embodiments, the combination may include the overlaid image 165, which may comprise the indicia 105 overlaid on the image 140 as the screen protector 100 is attached to the device 130. In some embodiments, the overlaid image 165 may provide an indication as to the alignment of the screen protector 100 relative to the display screen 135. For example, in instances in which the screen protector 100 is properly aligned with the display screen 135, the image 140 may be visible through the indicia 105 and/or the contrast portion 145 may be obscured by the opaque portion 110. Alternatively, or additionally, in instances in which the screen protector 100 is improperly aligned with the display screen 135, one or more aspects of the contrast portion 145 may be visible. For example, in instances in which the contrast portion 145 is red in color, the opaque portion 110 may not obscure all the contrast portion 145, such that the user may see one or more portions of red color, which may indicate an improper alignment of the screen protector 100 relative to the display screen 135.

In some embodiments, the second removable film may be configured to be removed by the user at any time. In some embodiments, the user may remove the second removable film after the screen protector 100 is attached to the display screen 135 and/or the device 130. For example, after the user has aligned the indicia 105 with the image 140 and attached the screen protector 100 to the display screen 135, the user may remove the second removable film. The second film, which may include the indicia 105, the opaque portion 110, and/or the link element 115, may be removed from the screen protector 100 when desired. The second film may also help protect the screen protector 100 from damage or harm during the installation process.

In a working example, a user may obtain and/or install an application on the device 130, and the device 130 may be configured to determine a device type and/or display the device type to the user. The device 130 may provide a display of the screen protector 100 that may be sized and shaped for the device 130. The device 130 may be configured to display the image 140, and the image 140 may be at least substantially the same or similar as the indicia 105, and the indica 105 may be disposed on the second removable film of the screen protector 100. The user may remove the first removable film from the screen protector 100 and may align the indicia 105 with the image 140, such that the opaque portion 110 may be sized and configured to obscured or conceal all or substantially all the contrast portion 145. After the screen protector 100 is attached to the device 130, the user may remove the second removable film, which may remove the indicia 105.

Modifications, additions, and/or omissions may be made to the screen protector 100, the device 130, and/or the combination 160 without departing from the scope of the present disclosure. For example, in some embodiments, any of the screen protector 100, the device 130, and/or the combination 160 may include any number of other components that may not be explicitly illustrated or described.

Figure 2:
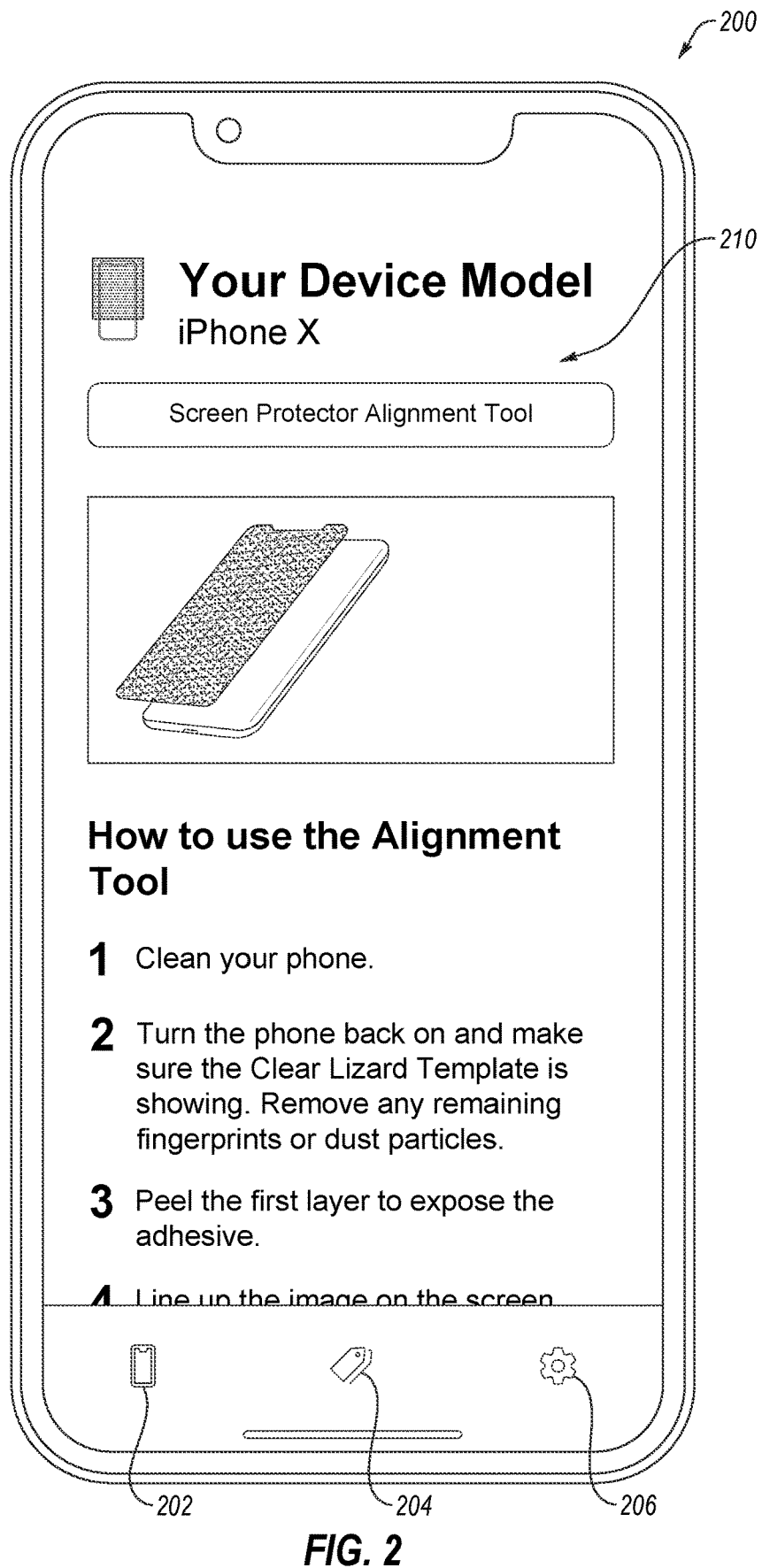
FIG. 2 illustrates an example user interface associated with an electronic device.

FIG. 2 illustrates an example graphical user interface (GUI) 200 associated with an electronic device, in accordance with at least one exemplary embodiment. The GUI 200 may include a first GUI button 202, a second GUI button 204, a third GUI button 206, and a display area 210.

In some embodiments, the GUI 200 may be displayed on a display screen of a device, such as the display screen 135 of the device 130 of FIG. 1B. In some embodiments, the GUI 200 may be configured to provide information and/or input/output (I/O) associated with attaching a screen protector to a device. For example, the GUI 200 may be configured to display the device type associated with the device in the display area 210.

In some embodiments, the first GUI button 202, the second GUI button 204, and the third GUI button 206 may be used to move to different pages of the GUI 200 that may be associated with attaching a screen protector to a device. In some embodiments, the first GUI button 202 may be configured to navigate the display area 210 to display installation instructions related to a screen protector and a device. For example, the display area 210 may display one or more steps for preparing and/or installing a screen protector to a device. In instances in which a screen protector has not been acquired, the display area 210 associated with the first GUI button 202 may provide instructions to determine the correct screen protector to acquire and/or provide device information that may be used in acquiring a screen protector. In these and other embodiments, the page displayed upon selecting the first GUI button 202 may include installation tips, answers to frequently asked installation questions, trainings associated with the screen protector, and/or videos associated with installing the screen protector.

In some embodiments, the second GUI button 204 may be configured to navigate the display area 210 to display one or more products that may be associated with an identified device. For example, in instances in which the device type may have been identified, the second GUI button 204 may navigate the display area 210 to a products page offering products for the identified device, which products may include screen protectors, device cases, external batteries, device charging cables, and/or other accessories that may be used with the identified device.

In some embodiments, the third GUI button 206 may be configured to navigate the display area 210 to a settings page, which may include a user account, device settings, and/or other settings associated with attaching a screen protector to a device. For example, the settings page associated with the third GUI button 206 may permit the user to modify a subscription service include including automatic orders for screen protector replacements, planned upgrades, and/or changes to the device, changes to the device service provider, loyalty program information, and/or other settings that may be associated with the device and/or user of the device.

In these and other embodiments, any of the first GUI button 202, the second GUI button 204, and the third GUI button 206 may be interchangeable regarding which GUI button branches to which page to be displayed. Alternatively, or additionally, the number of GUI buttons may be more or less depending on whether elements that may be displayed on a display screen may be combined or separated. For example, the displays associated with the first GUI button 202 and the second GUI button 204 may be combined such that the associated GUI buttons (e.g., the first GUI button 202 and the second GUI button 204) may be displayed as a single GUI button.

Modifications, additions, and/or omissions may be made to the GUI 200 without departing from the scope of the present disclosure. For example, in some embodiments, the GUI 200 may include any number of other components that may not be explicitly illustrated or described.

Figure 3:
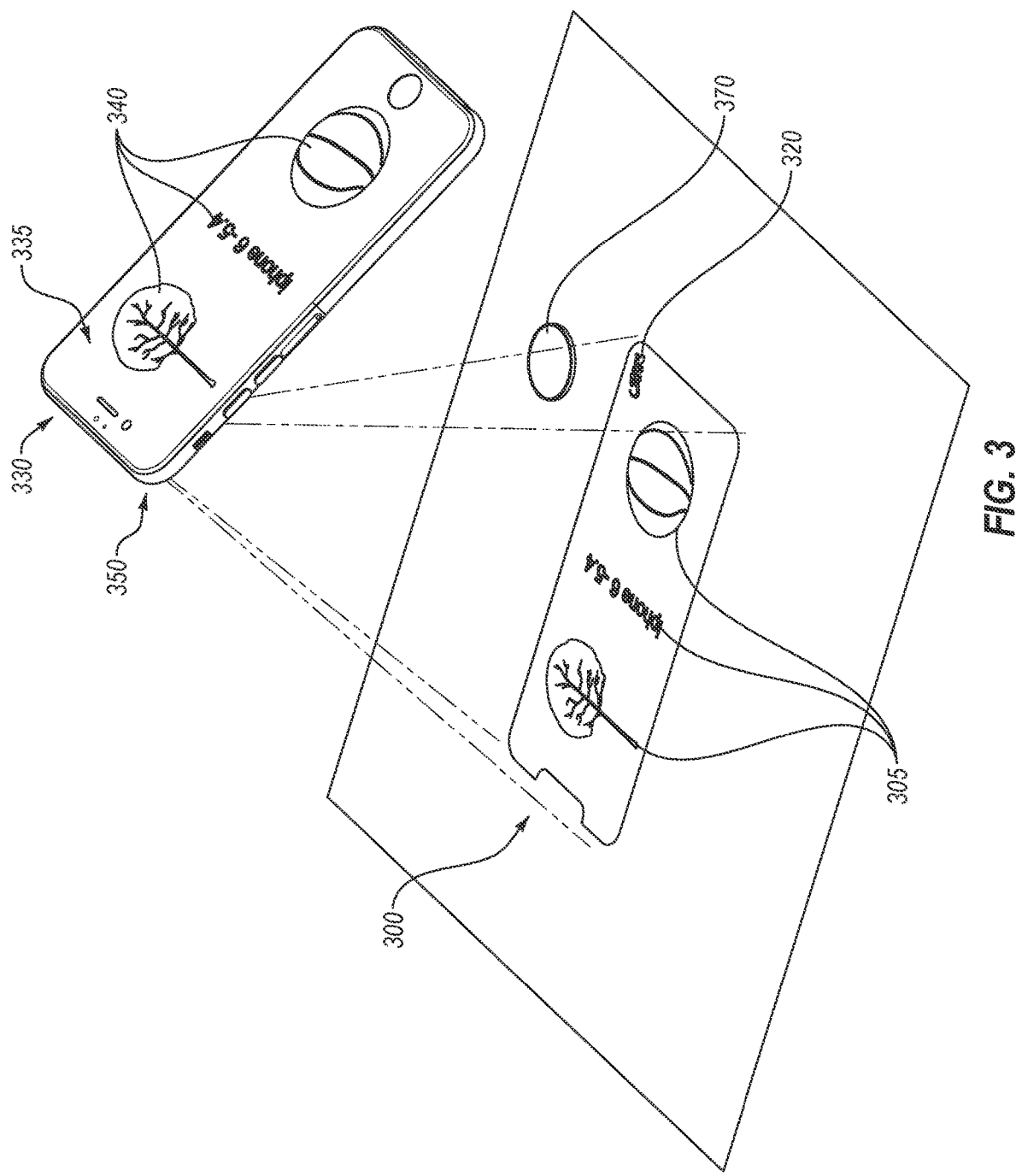
FIG. 3 illustrates an example environment of an example device and an example screen protector.

FIG. 3 illustrates an example environment of an example screen protector 300 and an example device 330, in accordance with at least one exemplary embodiment. In some embodiments, the screen protector 300 may include indicia 305 and a watermark 320. The device 330 may include a display screen 335, an image 340, a camera 350, and a processing unit 355. The device 330 may include elements, features, components, and the like similar or the same as other elements, features, components, and the like disclosed in connection with other exemplary embodiments.

In some embodiments, the screen protector 300 may be the same or similar to the screen protector 100 of FIG. 1A. For example, the screen protector 300 may include the indicia 305 which may be similar to the indicia 105 of FIG. 1A. Further, in some embodiments, the screen protector 300 may include a first removable film and a second removable film which may be associated with an adhesive side and the indicia 305 side, respectively. Alternatively, or additionally, the device 330 may be the same or similar to the device 130 of FIG. 1B. For example, the device 330 may include the display screen 335 and the image 340 which may be similar to the display screen 135 and the image 140, respectively, of FIG. 1B. In some embodiments, the screen protector 300 may not include the opaque portion, such as the opaque portion 110 of FIG. 1A. In these and other embodiments, the screen protector 300 may be configured to function substantially the same as the screen protector 100 of FIG. 1A. For example, the indicia 305 may be configured to align with the image 340 of the device which may contribute to aligning the screen protector 300 with the display screen 335 of the device 330.

In some embodiments, the watermark 320 may be included in or on the screen protector 300. In some embodiments, the watermark 320 may be oriented such that the watermark 320 may overlay a portion of the display screen 335. In some embodiments, the watermark 320 may be difficult to see and/or invisible in instances in which the display screen 335 is at least partially illuminated. For example, in instances in which the display screen 335 is at least partially illuminated, the watermark 320 positioned over a portion of the display screen 335, may substantially disappear from view. Alternatively, or additionally, the watermark 320 may be visible in instances in which the display screen 335 is not illuminated and/or dimmed. For example, in instances in which the display screen 335 is not illuminated or dimmed below a threshold amount, the watermark 320 positioned over a portion of the display screen 335, may substantially disappear from view. Alternatively, or additionally, in instances in which the watermark 320 is not positioned over the display screen 335, the watermark 320 may be visible whether the display screen 335 is illuminated or not illuminated.

In some embodiments, the device 330 may be configured to display the image 340 on the display screen 335. In some embodiments, the device 330 may obtain the image 340 for display from a camera image that may be obtained by the camera 350. For example, the camera 350 may obtain a camera image that may be associated with a screen protector (e.g., the indicia 305), which camera image may be displayed as the image 340 on the display screen 335.

In some embodiments, the indicia 305 may include pre-configured images and/or text, such as from the manufacturer of the screen protector 300. For example, a second film may be attached to the screen protector 300 and the second film may include the indicia 305. Alternatively, or additionally, post-manufacture text and/or images may be applied to the second removable film, and the text and/or images may form at least a portion of the indicia 305. For example, a user may draw on the second removable film, apply stickers, and/or supply other visual modifications, all or a portion of which may be used as at least a portion the indicia 305. In these and other embodiments, the indicia 305, including user added indicia, may be used to determine the image 340 for aligning the screen protector 300 with the device 330, as described herein.

In some embodiments, some markings on the first removable film may hinder the processing unit 355 from accurately determining the image 340 from the indicia 305 as the markings may be visible but not included in the indicia 305. In these and other embodiments, a user may cover the markings, such as with drawings and/or stickers as described herein, such that the drawings and/or stickers may be included in the indicia 305 and the drawings and/or stickers may obfuscate the markings.

In some embodiments, the processing unit 355 may be configured to convert the camera image into the image 340. Alternatively, or additionally, the processing unit 355 may be configured to direct operation of the camera 350, such as directing the camera 350 to obtain a camera image that may be used as the image 340.

In some embodiments, the processing unit 355 may be configured to determine the size and/or orientation of the camera image based on the size and/or orientation of the screen protector 300. For example, in instances in which the screen protector 300 is sized and shaped for the device 330, the processing unit 355 may interpret the dimensions of the screen protector 300 to determine the size and/or orientation of the camera image in generating the image 340.

In some embodiments, the processing unit 355 may include machine learning which may improve the conversion of the camera image to the image 340. For example, the machine learning may consider multiple instances of camera image conversions to an image 340 to improve a quality and/or accuracy of the image 340. In some embodiments, the machine learning may be configured to account for various camera angles, elevations, tilts, rotations, etc., in determining the image 340 from the camera image. Alternatively, or additionally, in some embodiments, the processing unit 355 and/or the machine learning may be configured to determine whether a scanned screen protector 300 may be compatible with the device 330. For example, in instances in which a user acquires a screen protector separately, the processing unit 355 may direct the camera 350 to obtain an image, perform a processing on the image including the machine learning processing as described herein, and determine whether the screen protector will fit the device 330. In some embodiments, the device 330 may be configured to provide an indication to the user whether the scanned screen protector 300 may be compatible with the device 330.

In some embodiments, an object 370 may be included with the camera image which may improve the conversion of the camera image to the image 340. For example, the object 370 may include any object that may include known and/or easily determinable dimensions. For example, the object 370 may include currency, such as bills or coins, rulers, tape measures, soda cans, water bottles, and/or any other object that may include a visually determinable dimension. In these and other embodiments, the object 370 may include a predetermined size. For example, the object 370 may include an object that may be fixed in size, such that the object 370 is unlikely and/or unable to change size. Alternatively, or additionally, the object 370 may include any object that may include standard measurement marks, such as millimeters, centimeters, inches, etc.

In some embodiments, the camera 350 may be configured to obtain a camera image of a second device, and the processing unit 355 may be configured to determine an appropriate screen protector for the second device. An appropriate screen protector may include a screen protector that is sized and shaped for a particular device. For example, a first user may use the camera 350 to capture a camera image of a second device of a second user, and the processing unit 355 and/or machine learning may be configured to determine an appropriate screen protector for the second device based on the camera image. In some embodiments, an object, such as the object 370 may be used in conjunction with the camera image to contribute to determining an appropriate screen protector for the second device.

Modifications, additions, and/or omissions may be made to the screen protector 300 and/or the device 330 without departing from the scope of the present disclosure. For example, in some embodiments, either of the screen protector 300 and/or the device 330 may include any number of other components that may not be explicitly illustrated or described.

Figure 4:
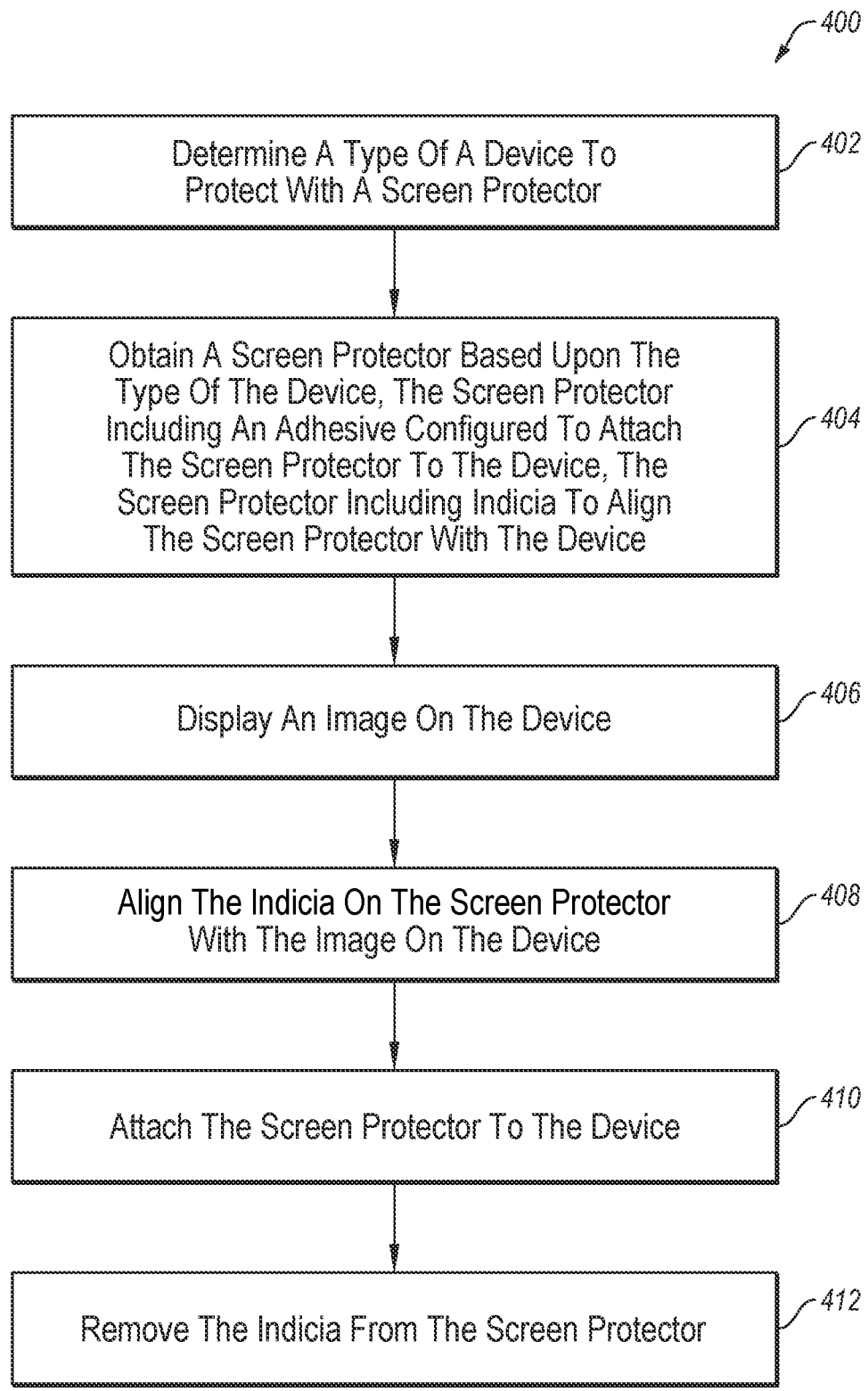
FIG. 4 illustrates an example method of attaching a screen protector to an electronic device.

FIG. 4 illustrates a process flow of an example method 400 of attaching a screen protector to an electronic device, in accordance with at least one embodiment described in the present disclosure. The method 400 may be arranged in accordance with at least one embodiment described in the present disclosure.

For simplicity of explanation, methods and/or process flows described herein are depicted and described as a series of acts. However, acts in accordance with this disclosure may occur in various orders and/or concurrently, and with other acts not presented and described herein. Further, not all illustrated acts may be used to implement the methods in accordance with the disclosed subject matter. In addition, those skilled in the art will understand and appreciate that the methods may alternatively be represented as a series of interrelated states via a state diagram or events. Although illustrated as discrete blocks, various blocks may be divided into additional blocks, combined into fewer blocks, or eliminated, depending on the desired implementation.

The method 400 may begin at block 402 where a type of a device to protect with a screen protector may be determined. In some embodiments, the type of the device to protect with the screen protector may be determined by the device without any input or any significant input by a user. Alternatively, or additionally, the type of the device to protect with the screen protector may be determined by the device and the device may display the type of device on a display screen that may be configured to be protected by the screen protector.

At block 404, a screen protector may be obtained based upon the type of the device. The screen protector may include an adhesive configured to attach the screen protector to the device. The screen protector may include indicia and all or some of the indicia may be used to align the screen protector with the device. In some embodiments, the indicia on the screen protector may be disposed on a removable film. In some embodiments, the screen protector may be configured to protect at least one feature of the device, and the device features may include a display screen, a camera lens, etc. In some embodiments, the screen protector may include a watermark. The watermark may be visible in some instances. For example, the watermark may be visible when the screen protector covers a display screen and/or the display screen is not illuminated. Alternatively, or additionally, the watermark may be invisible when the display screen is illuminated.

In some embodiments, the screen protector includes a link element configured to be scanned by the device. The link element may provide information or access to information, such as installation instructions, and the information may be displayed on the device At block 406, an image may be displayed on the device. In some embodiments, the image displayed on the device may be an image displayed on a display screen that may be configured to be protected by the screen protector. In some embodiments, the image may be obtained from one of a progressive web application, a web browser, an application, a local file, an image library, or the like.

Alternatively, or additionally, the image may be obtained from a camera image captured by a camera associated with the device. In some embodiments, machine learning may be configured to determine the image based on the camera image. The determining by the machine learning may include using an object having a predetermined size to determine the image.

At block 408, the indicia on the screen protector may be aligned with the image on the device. In some embodiments, the image displayed on the device and the indicia on the screen protector may at least substantially match.

At block 410, the screen protector may be attached to the device. For example, an adhesive layer may be exposed by removing a protective coating or film, and the adhesive may be used to attach the screen protector to the device.

At block 412, the indicia may be removed from the screen protector. For example, the indicia may be disposed on a film and the film may be removed.

Modifications, additions, or omissions may be made to the method 400 without departing from the scope of the present disclosure. For example, the method 400 may include a protective layer that may be configured to be removed from the adhesive before attaching the screen protector to the device. The method 400 may further include the screen protector configured to be attached to the device with the indicia on the screen protector at least partially covering the image displayed on the device.

In another example, the method 400 may include the screen protector configured to be attached to the device with the indicia on the screen protector at least partially covering the image displayed on the device. The method 400 may further include the indicia configured to be removed from the screen protector by detaching a removable film with the indicia.

In another example, the method 400 may include obtaining device information of the device in response to obtaining the type of the device. The method 400 may further include storing the device type and the device information in response to obtaining the device information. In some embodiments, the device information may include at least one of a device ID, an ISP, device geographic data, a device servicer, or a related device.

Alternatively, or additionally, the method 400 may include any number of other components that may not be explicitly illustrated or described.

Figure 5:
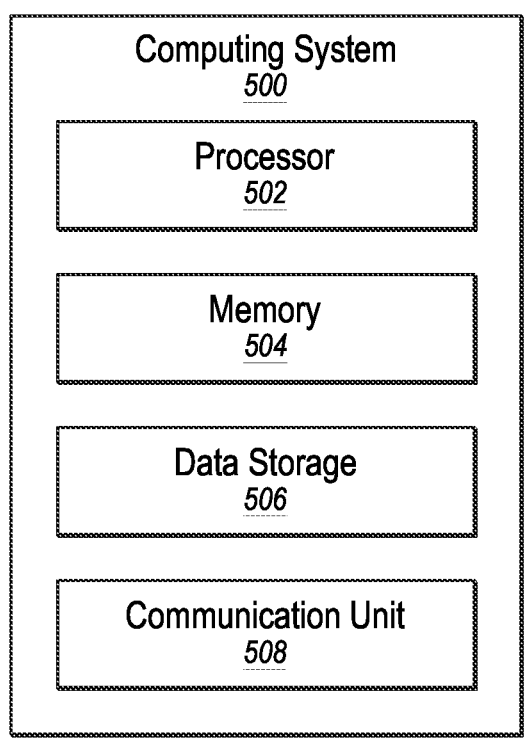
FIG. 5 illustrates an example computing system that may be used with an example screen protector and/or example device.

FIG. 5 illustrates an example computing system 500 that may be used for attaching a screen protector to an electronic device, in accordance with at least one exemplary embodiment. The computing system 500 may be configured to implement or direct one or more operations associated with attaching a screen protector to an electronic device, which may include the method 400 of FIG. 4. The computing system 500 may include a processor 502, memory 504, data storage 506, and a communication unit 508, which all may be communicatively coupled. In some embodiments, the computing system 500 may be part of any of the systems or devices described in this disclosure.

For example, the computing system 500 may be part of the device 130 of FIG. 1B and/or the processing unit 355 of FIG. 3. The computing system may be configured to perform one or more of the tasks described above with respect to the device 130 and/or the processing unit 355.

The processor 502 may include any computing entity, or processing device including various computer hardware or software modules and may be configured to execute instructions stored on any applicable computer-readable storage media. For example, the processor 502 may include a microprocessor, a microcontroller, a parallel processor such as a graphics processing unit (GPU) or tensor processing unit (TPU), a digital signal processor (DSP), an application-specific integrated circuit (ASIC), a Field-Programmable Gate Array (FPGA), or any other digital or analog circuitry configured to interpret and/or to execute program instructions and/or to process data.

Although illustrated as a single processor in FIG. 5, it is understood that the processor 502 may include any number of processors distributed across any number of networks or physical locations that are configured to perform individually or collectively any number of operations described herein.

In some embodiments, the processor 502 may be configured to interpret and/or execute program instructions and/or process data stored in the memory 504, the data storage 506, or the memory 504 and the data storage 506. In some embodiments, the processor 502 may fetch program instructions from the data storage 506 and load the program instructions in the memory 504. After the program instructions are loaded into memory 504, the processor 502 may execute the program instructions.

For example, in some embodiments, the processor 502 may be configured to interpret and/or execute program instructions and/or process data stored in the memory 504, the data storage 506, or the memory 504 and the data storage 506. The program instruction and/or data may be related to attaching a screen protector to an electronic device such that the computing system 500 may perform or direct the performance of the operations associated therewith as directed by the instructions. In these and other embodiments, the instructions may be used to perform the method 400 of FIG. 4.

The memory 504 and the data storage 506 may include computer-readable storage media or one or more computer-readable storage mediums for carrying or having computer-executable instructions or data structures stored thereon. Such computer-readable storage media may be any available media that may be accessed by a computer, such as the processor 502.

By way of example, and not limitation, such computer-readable storage media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store particular program code in the form of computer-executable instructions or data structures and which may be accessed by a computer. Combinations of the above may also be included within the scope of computer-readable storage media.

Computer-executable instructions may include, for example, instructions and data configured to cause the processor 502 to perform a certain operation or group of operations as described in this disclosure. In these and other embodiments, the term "non-transitory" as explained in the present disclosure should be construed to exclude only those types of transitory media that were found to fall outside the scope of patentable subject matter in the Federal Circuit decision of In re Nuijten, 500 F.3d 1346 (Fed. Cir. 2007). Combinations of the above may also be included within the scope of computer-readable media.

The communication unit 508 may include any component, device, system, or combination thereof that is configured to transmit or receive information over a network. In some embodiments, the communication unit 508 may communicate with other devices at other locations, the same location, or even other components within the same system. For example, the communication unit 508 may include a modem, a network card (wireless or wired), an infrared communication device, a wireless communication device (such as an antenna implementing 4G (LTE), 4.5G (LTE-A), and/or 5G (mmWave) telecommunications), and/or chipset (such as a Bluetooth® device (e.g., Bluetooth 5 (Bluetooth Low Energy)), an 802.6 device (e.g., Metropolitan Area Network (MAN)), a Wi-Fi device (e.g., IEEE 802.11ax, a WiMax device, cellular communication facilities, etc.), and/or the like. The communication unit 508 may permit data to be exchanged with a network and/or any other devices or systems described in the present disclosure. For example, when the computing system 500 is included in the device 330 of FIG. 3, the communication unit 508 may allow the device 330 to communicate with another device and/or a network, such as the internet.

Modifications, additions, or omissions may be made to the computing system 500 without departing from the scope of the present disclosure. For example, in some embodiments, the computing system 500 may include any number of other components that may not be explicitly illustrated or described. Further, depending on certain implementations, the computing system 500 may not include one or more of the components illustrated and described.

As indicated above, the embodiments described herein may include the use of a computing system (e.g., the processor 502 of FIG. 5) including various computer hardware or software modules. Further, as indicated above, embodiments described herein may be implemented using computer-readable media (e.g., the memory 504 of FIG. 5) for carrying or having computer-executable instructions or data structures stored thereon.

In some embodiments, the different components, modules, engines, and services described herein may be implemented as objects or processes that execute on a computing system (e.g., as separate threads). While some of the systems and methods described herein are generally described as being implemented in software (stored on and/or executed by hardware), specific hardware implementations or a combination of software and specific hardware implementations are also possible and contemplated.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, it is understood that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present disclosure have been described in detail, it should be understood that the various changes, substitutions, and alterations could be made hereto without departing from the spirit and scope of the present disclosure.

What is claimed is:

1. A method of attaching a screen protector to an electronic device, the method comprising:
   determining a type of a device to protect with a screen protector;
   obtaining a screen protector based upon the type of the device, the screen protector including an adhesive configured to attach the screen protector to the device, the screen protector including an indicia to align the screen protector with the device and an opaque portion disposed inverse to the indicia on the screen protector such that the opaque portion surrounds the indicia;
   displaying an image on a display screen of the device, where the image is substantially the same as the indicia;
   aligning the indicia and the opaque portion on the screen protector with the image on the device such that the image is fully visible through the indicia when the screen protector is properly aligned with the display screen;
   attaching the screen protector to the device; and
   removing the indicia and the opaque portion from the screen protector.

2. The method of claim 1, wherein determining the type of the device to protect with the screen protector is determined by the device without any input by a user attaching the screen protector to the device.

3. The method of claim 1, wherein determining the type of the device to protect with the screen protector is determined by the device and the device displays the type of device on a display screen that is configured to be protected by the screen protector.

4. The method of claim 1, wherein the image displayed on the device is an image displayed on a display screen that is configured to be protected by the screen protector.

5. The method of claim 1, wherein the indicia on the screen protector is disposed on a removable film.

6. The method of claim 1, wherein the screen protector protects more than one feature of the device.

7. The method of claim 1, wherein the screen protector includes a watermark, the watermark being visible when the screen protector covers a display screen and the display screen is not illuminated, the watermark being invisible when the display screen is illuminated.

8. The method of claim 1, further comprising:
   removing a protective layer from the adhesive before attaching the screen protector to the device; and
   attaching the screen protector to the device with the indicia on the screen protector at least partially covering the image displayed on the device.

9. The method of claim 1, further comprising:
   attaching the screen protector to the device with the indicia on the screen protector at least partially covering the image displayed on the device; and
   removing the indicia from the screen protector by detaching a removable film with the indicia.

10. The method of claim 1, wherein the image is obtained from one of a progressive web application, a web browser, an application, a local file, or an image library.

11. The method of claim 1, wherein the image is obtained from a camera image captured by a camera associated with the device.

12. The method of claim 11, wherein machine learning determines the image based on the camera image, including using an object having a predetermined size to determine a size and orientation of the image.

13. The method of claim 1, further comprising:
   in response to obtaining the type of the device, obtaining device information of the device; and
   in response to obtaining the device information, storing the type of the device and the device information,
   wherein the device information includes at least one of a device ID, an ISP, device geographic data, a device servicer, or a related device.

14. The method of claim 1, wherein the screen protector includes a link element configured to be scanned by the device to provide installation instructions on the device.

15. An apparatus comprising:
   a screen protector including a first side and a second side,
   an adhesive disposed on the first side of the screen protector, the adhesive configured to attach the screen protector to a screen of an electronic device;
   an indicia disposed on the second side of the screen protector, the indicia configured to be aligned with an image displayed on the screen of the electronic device to facilitate attachment of the screen protector to the screen such that the image is fully visible through the indicia when the screen protector is properly aligned with the screen, where the image is substantially the same as the indicia; and
   an opaque portion disposed inverse to the indicia on the second side of the screen protector such that the opaque portion surrounds the indicia.

16. The apparatus of claim 15, further comprising a removable film covering the adhesive disposed on the first side of the screen protector, the removable film being removable before the screen protector is attached to the screen of the electronic device.

17. The apparatus of claim 15, wherein the indicia is disposed on a removable film, the removable film with the indicia being configured to be removed from the electronic device after the screen protector is attached to the electronic device.

18. The apparatus of claim 15, further comprising a watermark on the screen protector, the watermark being visible when the screen protector covers the screen and the screen is not illuminated, the watermark being invisible when the screen is illuminated.

* * * * *